Aug. 19, 1941.   J. M. D. DE TAILLY   2,252,703
APPARATUS FOR THE SUSPENSION OF GLASS ARTICLES OR SHEETS
Filed April 28, 1936   2 Sheets-Sheet 1

Inventor
JACQUES MARIE DARODES DE TAILLY

By Dudly & Cole
Attorneys

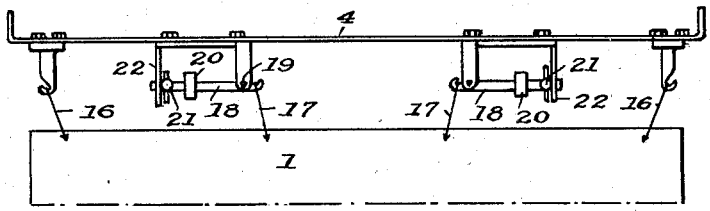
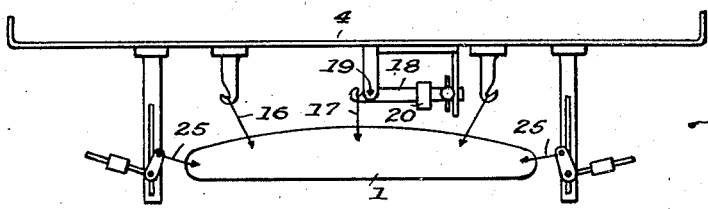
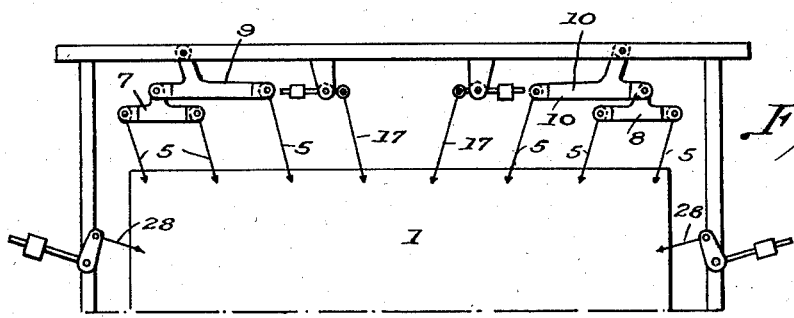
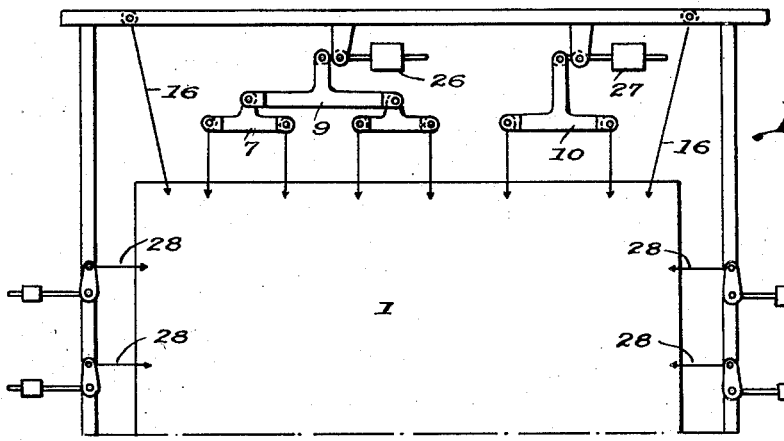

Patented Aug. 19, 1941

2,252,703

UNITED STATES PATENT OFFICE 2,252,703

APPARATUS FOR THE SUSPENSION OF GLASS ARTICLES OR SHEETS

Jacques Marie Darodes de Tailly, Thourotte, France, assignor to The American Securit Company, Washington, D. C., a corporation of Delaware Application April 28, 1936, Serial No. 76,865
In France April 30, 1935

15 Claims. (Cl. 49—14)

The present invention relates to apparatus for holding the glass sheets or articles in a vertical position during thermic treatments which are capable of causing deformations of said sheets or articles, such as for example their heating at a temperature near the softening point, and the subsequent rapid cooling of them for the purpose of tempering.

In the course of these operations it is known to maintain the glass sheets or plates in a vertical position by suspending them by means of tongs having points which bear against the glass and penetrate slightly into it when the glass is soft. Said tongs are constructed in such a manner that the pressure of the points on the glass sheets or plates is adjusted according to the weight carried by it; for this reason they are, for example, in the shape of an articulated or jointed lozenge; one of the vertexes constitutes the hinge of the tong and the opposite vertex is connected to a fixed support, the jaws of the tongs being constituted by two lengthened sides of the lozenge.

In the known devices, the fixed support is constituted by a horizontal bar to which the tongs are attached directly, the points of attachment of the tongs to the glass sheet or plate are situated along the upper edge of the sheet or plate and the force exerted by each tong is directed vertically, counterbalancing the weight.

When the dimensions of the glass sheet or plate are small and when it is light, it is possible to have a convenient suspension by using two tongs only which are placed vertically.

But when the dimensions of the glass sheet or plate and its weight are of greater value usually attained in practice, the suspension by means of two tongs only is not so good and presents the following inconveniences:

The pressure exerted by each of the tongs becoming too great, the points of the tongs often penetrate so far into the glass as to produce unduly deep and large holes even capable to produce the breakage of the sheet.

The sheet itself is submitted, near the places where the tong-points are pressed, to a too great pull and it is deformed in its proper plane near said places.

Lastly the distance between the two tongs can reach values such that the sheet bends between them and is deformed or bent out of its proper plane i. e. out of the vertical plane of suspension.

In order to avoid such inconveniences a greater number of tongs has been used, the tongs being attached directly to the horizontal support bar in the same way as when only two tongs were used. But this process is not entirely satisfactory for the following reasons.

On the one hand, at the beginning of the tempering operation, i. e. before the heating operation, the glass sheet to be suspended is cold and hard, and it is difficult, when suspending it with more than two tongs, to have the weight of the sheet regularly distributed between all the tongs.

On the other hand, even if a convenient distribution of the forces has been realized at ordinary temperature, this distribution is modified during the thermic treatments because of the differences in the expansion of the supporting means and of the glass sheet.

The result is that the tension of the tongs is not exactly determined, and some of them may be accidentally overloaded, thereby occasioning the risks of breakage and deformation of the glass sheet.

The present invention has for its object to permit to suspend a glass sheet or plate by means of numerous tongs or similar members, acting along the edge of the glass sheet or plate while avoiding the inconveniences hereinabove mentioned.

In the apparatus of the present invention, each tong exerts on the glass sheet or plate a determined pull action, the value of which may be regulated at will at the time of the suspension of the glass sheet or plate. If necessary it is possible to determine the pull of each tong in order that it may be the same for all the tongs.

The present invention relates to a system of suspension of the glass articles and particularly of the glass sheets, comprising a fixed support and one or several tongs which are connected yieldingly or elastically to such support. The connection between the support and the tongs is made by independent means which may be adjusted in order to regulate the pull exerted by each tong.

According to a preferred form of the present invention tongs of the structure described hereinafter are used. Each of said tongs is attached to an end of an arm pivoting around a fixed point rigidly connected to the tongs supporting means, said arm carrying at its other end an adjustable balance weight in order to regulate the pull exerted by each tong on the glass article.

Other means to connect the tongs to the fixed support may also be used according to the present invention, such as springs.

The tongs of the structure described in the present invention may be substituted to all the tongs of the system of suspension or at least to some of them, the others being directly connected to the fixed support in the known manner.

Generally two of the tongs are maintained directly connected to the support.

Each of the tongs directly connected to the support may be replaced by a group of tongs having a single point of attachment with the fixed support, said tongs being carried by pivoting arms articulated to one another.

According to the invention the pull of each tong may be independent of the relative movements which can be produced between the glass sheet and the support during the thermic treatments of the glass sheet.

Further the invention has for its object to avoid the deformations of the glass sheet by giving to the forces exerted by the tongs a direction such that the sheet is always maintained in tension along every desired direction.

The invention will be clearly understood and other new characteristics will be mentioned in the course of the description of the figures of the drawings.

In the accompanying drawings are represented only by way of example different forms of devices according to the present invention and used for example to support glass sheets.

Figures 4, 5, 6 and 7 are front views of other forms of the device according to the invention.

Figure 1:
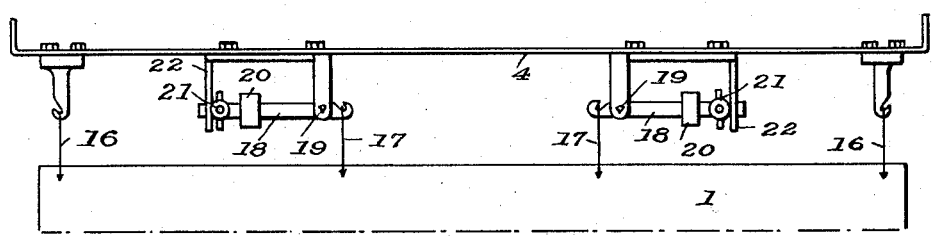
Figure 1 is a front view of one form of the device.

In the device shown in Figure 1, the glass sheet 1 is suspended on the one hand by means of two tongs 16 attached directly to the tong bar 4 as in the known apparatus and, on the other hand by a certain number of tongs 17 connected in a particular manner to the tong bar 4. Each of said tongs 17 is attached to one end of an arm 18 pivoted at 19 to a lug depending from the tong bar 4 while the other end of the arm 18 carries an adjustable balance weight 20. The arm 18 may further be locked to the lug in any position, as explained hereinafter for particular purpose, by means of nuts 21 shown clearly in Figures 2 and 3. These nuts are used to press the two parts 22 of the guide member against the projections 23 of the arm 18 and thus it is possible to maintain the arm in any desired position.

As shown also in the drawings the arm 18 may be mounted on knife-edge 24 in such a manner that it is very sensitive and can only be moved in the vertical plane of suspension.

It is generally preferred to not use the means for locking the arm 18 to the lug 22; the sheet is first suspended to the ordinary tongs 16 while supporting it possibly by hand; the tongs 17 are afterwards adjusted and the position of the balance weight 20 is regulated in such a manner that the tongs 17 have the desired tension. When the suspended sheet is submitted to a thermic treatment and when the supporting members expand in a different manner than the sheet, the arm 18 can work freely and maintain invariable the action of the tongs 17; the distribution of the strains remains consequently substantially constant. For example, in the case of four tongs, it will be possible to have each tong supporting a quarter of the weight of the glass sheet.

A further object of the invention is to place the tongs and their points of attachment in such a manner that the action on the glass sheets—at least for some tongs if not for the whole—are directed obliquely instead of being exclusively vertical, these oblique actions remaining always in the vertical plane of suspension. These forces have horizontal components acting to stretch the sheet and maintain it flat.

Figure 4 shows an example of this disposition. The device is similar to that of Figure 1, but the glass sheet is suspended by giving to the tongs a determined inclination with respect to the vertical and in such a manner that the sheet is placed under tension. Then the forces exerted by the tongs on the upper edge of the sheet are such that it is pulled horizontally. This tension prevents the deformation of the sheet out of its plane and impedes its tendency to warp.

The arrangement of the oblique tongs may be applied not only for the tongs acting on the upper edge of the sheet but also to tongs such as those represented in 25 (Figure 5) and which are attached on the vertical edges of the sheet, in such a manner that the tension strength is applied to the whole sheet.

In some cases it is advantageous to combine the tongs having an adjustable balance weight, such as tongs 17 with other complementary tongs such as those represented in Figure 6. In this figure the tongs 16 shown in Figures 1 and 4 are replaced by groups of tongs 5 articulated at the ends of superposed pivoted arms articulated to one another, each group of tongs 5 having a single point of attachment to the tong bar. The two groups represented in Figure 6 comprise a pair of tongs 5 articulated at both ends of an arm 7 or 8 which is pivoted at the end of another arm 9 or 10, the other end of said arm carrying another tong 5.

In each group of tongs 5 the distribution of the forces between these tongs is automatic and is variable with the ratio between the lengths of the different arms and with the position of the tongs relatively to the center of gravity of the glass sheet.

In combinations according to the invention, each fixed tongs 16 may be replaced by a group of tongs 5 supported on pivoted arms, and there are generally as shown in the drawings, either two groups of tongs, or a fixed tong and a group of tongs or two fixed tongs.

Other tongs 28 are represented in Figure 6 for the lateral edges of the sheet.

The means to connect with a balance weight the tongs to the fixed support may be used, according to the present invention, for one tong only or for several tongs as shown in Figure 7, where tongs 5 are attached at both ends of pivoted arms 7 or 10; the arms 7 may be articulated by their axes at both ends of an arm 9 and both arms 9 and 10 of each group of tongs are suspended to other arms with balance weights 26 and 27.

In all the combinations represented in the drawings all the connections except two are constituted by devices with balance weights. Each of the two connections without balance weights is either for an ordinary tong or for a group of tongs on superposed pivoted arms. But it is evident that it is also possible to have only one tong or group of tongs rigidly connected to the support and even to have all the tongs connected to the support by means of pivoted arms with balance weights.

Figure 2:
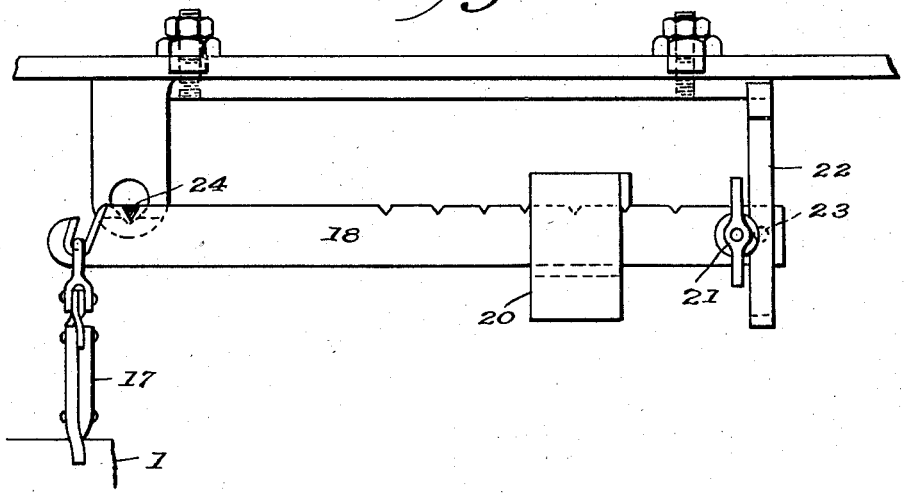
Figure 2 is a vertical section on a larger scale of a detail in said device.
Figure 3:
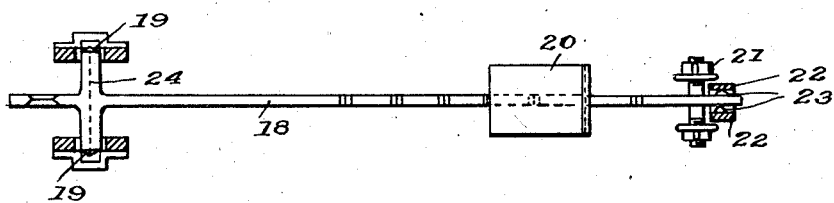
Figure 3 is a horizontal section of the same detail.

In the case where the relative displacements which may be produced during the heat treatment between the sheet and the support are negligible, it is possible, in all the devices previously described, to fasten or to lock, after they have been regulated at ordinary temperature, all or a certain number of the members. In such a manner the apparatus of suspension is not so sensitive to shocks during the heat treatment. The members with balance weights may be provided in this case, with the fastening means comprising nuts 21, such as represented in Figures 2 and 3; the superposed pivoted arms may also be fastened by a similar system, or merely by means of fastening nuts placed at each articulation of the pivoted arms to one another.

I claim:

1. An apparatus for suspending a glass article subjected to thermic treatments comprising a support, tongs to grip the article which are yieldingly connected to said support, and means to control independently for each of the tongs the force applied to said tongs, said tongs having the capability of movement in the direction of exertion of the force thereby to render substantially invariable the magnitude of the force for which the tongs have been adjusted.

2. An apparatus for suspending a glass article subjected to thermic treatments comprising a support, an arm carried by said support and rotatable about a horizontal axis, tongs attached to one end of said arm to grip the article and a balance weight carried by the other end of said arm.

3. An apparatus for suspending a glass article subjected to thermic treatments comprising a support, a plurality of arms carried by said support and rotatable about horizontal axes, a plurality of tongs to grip the article, each of said tongs being attached to one end of one of said arms, and balance weights carried by the other end of each of said arms.

4. An apparatus for suspending a glass article subjected to thermic treatments comprising a support, an arm carried by said support and rotatable about a horizontal axis, tongs attached to one end of said arm to grip the article, and an adjustable balance weight carried by the other end of said arm.

5. An apparatus for suspending a glass article subjected to thermic treatments comprising a support, a plurality of arms carried by said support and rotatable about horizontal axes, a plurality of tongs to grip the article, each of said tongs being attached to one end of one of said arms, and adjustable balance weights carried by the other end of each of said arms.

6. An apparatus for suspending a glass article subjected to thermic treatments comprising a support, an arm carried by said support and rotatable about a horizontal axis, tongs attached to one end of said arm to grip the article, an adjustable balance weight carried by the other end of said arm, and means to fasten or lock said arm at any desired position.

7. An apparatus for suspending a glass article subjected to thermic treatments comprising a support, a plurality of arms carried by said support and rotatable about horizontal axes, several tongs to grip the article, each of said tongs being attached to one end of each of said arms, adjustable balance weights carried by the other end of each of said arms, and means to fasten or lock each arm at any desired position.

8. An apparatus for suspending a glass article subjected to thermic treatments comprising a support, tongs to grip the article, at least one of said tongs directly connected to said support, at least one arm carried by said support and rotatable about a horizontal axis, another of said tongs being attached to one end of said arm, and an adjustable balance weight carried by the other end of said arm.

9. In an apparatus for suspending a glass article subjected to thermic treatments comprising a support, at least one pivoting arm carried by said support, tongs articulated at the ends of said pivoting arm, at least another pivoting arm carried by the support, tongs articulated at the end of the second-mentioned pivoting arm, and a balance weight carried by the other end of said last arm.

10. In an apparatus for suspending a glass article subjected to thermic treatments comprising a support, at least one pivoting arm carried by said support, at least another pivoting arm carried by the first-mentioned pivoting arm, tongs articulated at the ends of said pivoting arms, at least another pivoting arm carried by the support, tongs articulated at the end of this last-mentioned pivoting arm, and a balance weight carried by the other end of said last arm.

11. In an apparatus for suspending a glass article subjected to thermic treatments comprising a fixed support, at least one pair of tongs directly connected to said fixed support, at least one pivoting arm carried by the support, tongs articulated at the ends of said pivoting arm, at least another pivoting arm carried by the support, tongs articulated at the end of the second-mentioned pivoting arm, and a balance weight carried by the other end of said last arm.

12. In an apparatus for suspending a glass article subjected to thermic treatment comprising a fixed support, at least one pair of tongs directly connected to said fixed support, at least one pivoting arm carried by said support, at least another pivoting arm carried by the first-mentioned pivoting arm, tongs articulated at the ends of said pivoting arms, at least another pivoting arm carried by the support, a pair of tongs articulated at the end of this last mentioned pivoting arm, and a balance weight carried by the other end of said last arm.

13. In an apparatus for suspending a glass article in position for thermic treatments, a fixed support, a pivoted arm connected to the support, a balance weight carried by said arm on one side of its pivot, an arm pivotally suspended from said first arm at the opposite side of the pivot thereof, and a group of tongs articulated at the ends of last said arm.

14. In an apparatus for suspending a glass article in position for thermic treatments, a fixed support, a pivoted arm connected to the support, a balance weight carried by said arm on one side of its pivot, an arm pivotally suspended from said first arm at the opposite side of the pivot thereof, a group of tongs articulated at the ends of last said arm, and tongs directly connected to said fixed support.

15. An apparatus for suspending a glass article subjected to thermic treatments comprising a support, tongs carried by said support through the intermediary of a yielding connection therebetween, and means for controlling independently the force adapted to be exerted by said tongs at any predetermined setting thereof with respect to said support and the article gripped thereby.

JACQUES MARIE DARODES DE TAILLY.